United States Patent
Larsen et al.

(12)

(10) Patent No.: US 6,381,468 B1
(45) Date of Patent: *Apr. 30, 2002

(54) USER INTERFACE FOR A HAND-PORTABLE PHONE

(75) Inventors: Flemming Klovborg Larsen, Copenhagen (DK); Christian Lindholm, Helsinki (FI)

(73) Assignee: Nokia Mobiel Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/975,232

(22) Filed: Nov. 20, 1997

(30) Foreign Application Priority Data

Nov. 22, 1996 (GB) ............................................... 9624520
Feb. 21, 1997 (GB) ............................................... 9703645

(51) Int. Cl.⁷ .............................. H04B 1/38; H04B 1/00
(52) U.S. Cl. ..................... 455/550; 455/566; 455/575
(58) Field of Search ................................. 455/550, 566, 455/575; 379/354, 355

(56) References Cited

U.S. PATENT DOCUMENTS

| | | | | | |
|---|---|---|---|---|---|
| 5,561,705 A | * | 10/1996 | Allard et al. | ................ | 455/564 |
| 5,594,778 A | * | 1/1997 | Schaupp, Jr. et al. | ........ | 455/418 |
| 5,633,912 A | * | 5/1997 | Tsoi | ............................ | 455/566 |
| 5,758,295 A | * | 5/1998 | Ahlberg et al. | ............. | 455/566 |
| 5,852,783 A | * | 12/1998 | Tabe et al. | .................. | 455/550 |
| 5,884,185 A | * | 3/1999 | Kim et al. | ................... | 455/550 |
| 5,966,671 A | * | 10/1999 | Mitchell et al. | ............. | 455/575 |
| 6,026,161 A | * | 2/2000 | Larsen et al. | .......... | 379/433.06 |

FOREIGN PATENT DOCUMENTS

GB     2319691 A     5/1998

* cited by examiner

Primary Examiner—Nay Maung
Assistant Examiner—Temica M. Davis
(74) Attorney, Agent, or Firm—Perman & Green, LLP

(57) ABSTRACT

A radiophone is provided with a user interface including a single multi-functionality key with multiple functionality, including call handling. The present functionality of said multi-functionality key is displayed on a display. The functionality of said multi-functionality key and the information displayed on the display are controlled by a controller, which monitors the information displayed on the display and controls the functionality of said multi-functionality key in dependence on the displayed information.

15 Claims, 8 Drawing Sheets

USER INTERFACE FOR A HAND-PORTABLE PHONE

BACKGROUND OF THE INVENTION

The invention relates to a radiotelephone or handset having a user interface comprising a display and a keypad including a multi-functionality key with multiple functionality.

The term "radiophone" covers a portable unit which, with a transmitter/receiver, is capable of transmitting signals with speech or data via electromagnetic waves/radio waves to another unit comprising a transmitter/receiver.

The phones sold by the applicants as model Nokia 2110 and Nokia 8110 are exponents of the presently dominating user interface style based on two menu handling keys (soft keys) with multiple functionality for accessing phone setting, handling messages, setting call options, security options and so on. In idle mode the two soft keys of the phone allow access to the menu structure and the phone book, respectively. The phone book is a phone number database stored on the SIM card of the phone or in the memory in the phone itself. The call handling is handled by two other keys—one for establishing or answering a call and one for terminating a call. These two keys are separated due to the fact that the call establishing key must be used several times for establishing a conference call. However, the users ask for a more well-arranged and more manageable keypad.

SUMMARY OF THE INVENTION

In accordance with the invention there is provided a phone with a user-interface including a multi-functionality key with multiple functionality for handling access to the menu structure of the phone and call handling; a display on which the present functionality of said multi-functionality key is displayed; a controller which controls the functionality of said multi-functionality key and the information displayed on the display; said phone being capable of assuming a plurality of states controlled by the controller, whereby a group of predetermined actions associated with the state concerned may be performed by means of said multi-functionality key; and said controller unit selecting and displaying an action from said group of actions as the present functionality for said single multi-functionality key.

This allows the call handling keys to be included in the menu handling key already used. The controller monitors the status/mode of the phone and suggests a call handling functionality for the menu handling key, when such a functionality can be performed, based on the status/mode of the phone and the information present in the display or in the phone.

The invention provides a user interface for a radiotelephone which facilitates the normal operation.

The alternative functionality at the present status/mode of the phone will be available via a scroll key by means of which the user may toggle between the default call handling functionality and the group of alternative functionalities. The group of alternative functionalities may be selected by the multi-functionality key, and the scroll key may then be used for running through the alternative funtionalities, which are selectable by the multi-functionality key.

In accordance with the invention the call handling, that is establishing an outgoing call, answering an incoming call and terminating an ongoing call, is provided by the very same key as gives access to the menu structure of the phone. In most phones according to the prior art, two key deals with the call handling, and a single key deals with the menu access. According to the invention the functionality of three keys is integrated in a single key. This is possible due to the controller which monitors the status of the phone, and when a call handling action is possible, the controller controls the single multi-functionality key to assume the call handling action in question.

For example, when a number has been entered into the display, either selected from the stored phone number database (phone book) or entered manually using the keypad, the controller controls the multi-functionality key to assume a "call establishment" functionality using the displayed number. When the controller detects an incoming call, the controller controls the multi-functionality key to assume an "answering" functionality. When the call has been established, the controller changes the default option of the multi-functionality key to a "call termination" functionality. Alternative functionalities for the multi-functionality key will be available by using a scroll key. These alternative functionalities may comprise establishing a conference call, when a call has been established, or saving the displayed number in the phone book instead of establishing a call.

If the user decides to make a call by means of the single multi-functionality key, the phone changes its state to a "call established" state when the call has been established, and then the new default function of the single multi-functionality key will be to terminate the call. This means that the next activation of the single multi-functionality key will terminate the call. If a conference call is to be established, this is done by means of the scroll key via the group of possible functions associated with the state concerned. When the conference call facility has been found, the facility has to be selected by pressing the single multi-functionality key once.

According to the preferred embodiment of the invention the phone number database (phone book) in the phone is part of the menu structure. Until now this database has been available via a second soft key. This new easy way of establishing a call will probably accelerate the major trend within portable phones where a major part of the established outgoing calls is initiated from the phone number database. According to this embodiment of the invention the call may be initiated directly from the phone book. The editing options for the phone book will be accessible via the alternative functionality of the single multi-functionality key.

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
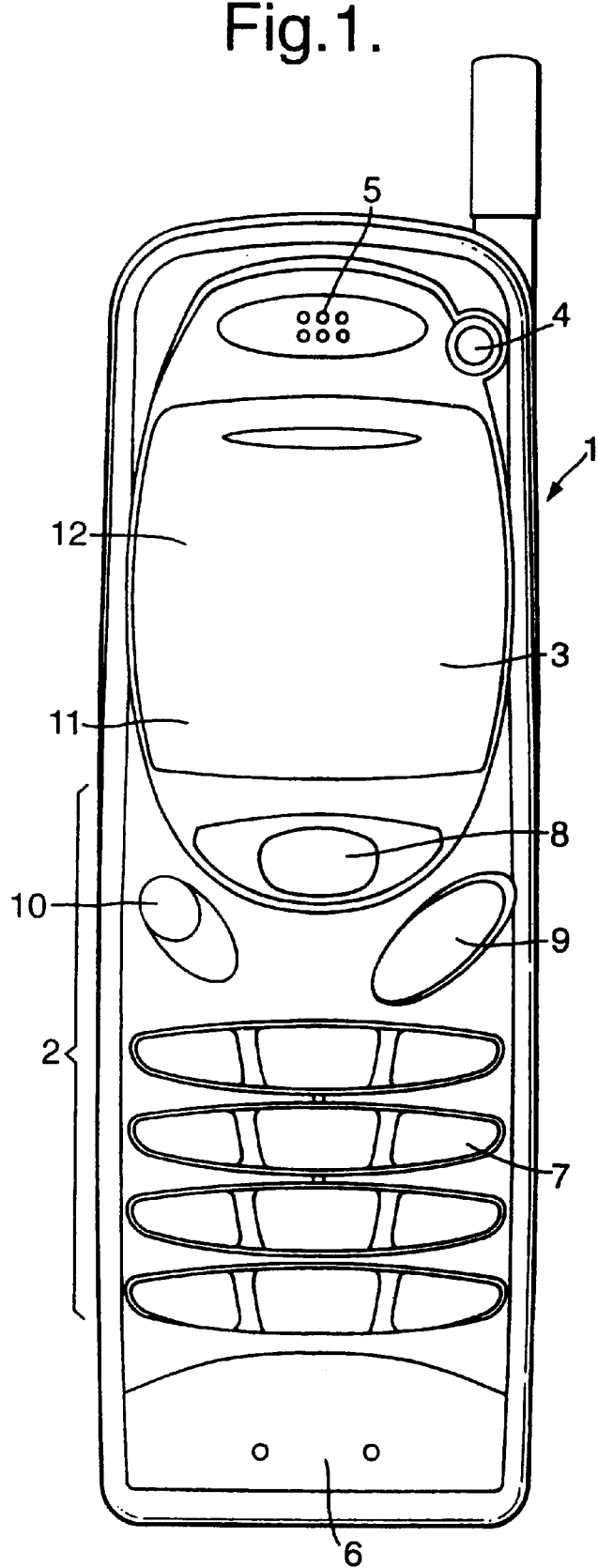
FIG. 1 shows a preferred embodiment of a portable phone having a user interface according to the invention.

FIG. 1 shows a preferred embodiment of a radiophone according to the invention, and it will be seen that the phone, which is generally designed by 1, comprises a user interface having a keypad 2, a display 3, an on/off button 4, an earpiece 5, and a microphone 6. The keypad 2 has a first group 7 of keys in the form of alphanumeric keys, by means of which the user can enter a telephone number, write a text message (SMS), write a name (associated with the phone number), etc. The user uses the first group of keys primarily for entering data in the phone (entry events).

The keypad 2 additionally comprises a second group of keys which, in the preferred embodiment, comprises a single multi-functionality key 8 with multiple functionality whose function depends on the present state of the phone. The default function or the present function of the single multi-functionality key 8 is displayed in a predetermined area 21 of the display 3. In the preferred embodiment, the second group of keys additionally comprises a scroll key 9, by means of which the user can jump selectively from one item to the preceding or the succeeding item in the menu loop of the phone, while he gets access to a sub-menu loop under the item concerned in the main menu loop by activation of the single multi-functionality key. The clear key 10 may be used e.g. for erasing the digit or letter entered last by brief depression, while depression of a longer duration will erase the entire number or word. Like the single multi-functionality key 8, the scroll key 9 and the clear key 10 may advantageously be redefined in some states, which appears from the following.

Figure 3:
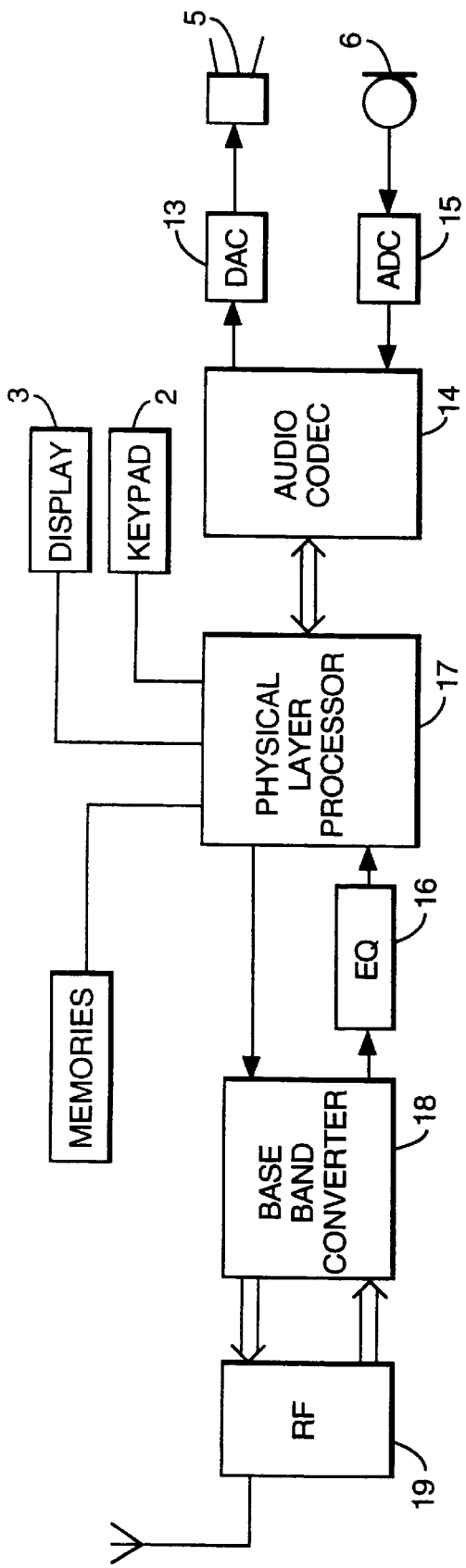
FIG. 3 schematically shows the hardware parts of a portable phone which are essential to the understanding of the invention.

FIG. 3 schematically shows the most important parts of a preferred embodiment of a portable phone, said parts being essential to the understanding of the invention. The preferred embodiment of the phone of the invention is adapted for use in connection with the GSM network, but, of course, the invention may also be applied in connection with other phone networks, such as cellular networks and various forms of cordless phone systems. The microphone 6 records the user's speech, and the analog signals formed thereby are A/D converted in an A/D converter 15 before the speech is encoded in an audio codec unit 14. The encoded speech signal is transferred to a physical layer processor 17, which i.a. supports the GSM terminal software. The processor 17 also forms the interface to the peripheral units of the apparatus, including the memories (RAM, ROM), the display 3 and the keypad 2 (as well as SIM, data, power supply, etc.). The processor 17 communicates with the RF part 19 via a baseband converter 18 and a channel equalizer 16. The audio codec unit 14 speech-decodes the signal, which is transferred from the processor 17 to the earpiece 5 via a D/A converter 13. The units 13–18 are usually integrated in a chip set, an example of such a commercially available chip set being AD20msp410 GSM from Analog Devices with associated protocol software from The Technology Partnership (TTP).

The processor 17, which serves as the controller unit in a manner known per se in the preferred embodiment, is connected to the user interface. Thus, it is the processor which monitors the activity in the phone and controls the display 3, 11 in response thereto. Therefore, it is the processor 17 which detects the occurrence of a state change event and changes the state of the phone and thus the display text. A state change event may be caused by the user when he activates the keypad, which is called an entry event, and also by the network connection of the phone or by another event beyond the user's control, which is called a non user event. Non user events comprise status change during call set-up, change in battery voltage, change in antenna conditions, message on reception of SMS, etc.

Figure 2:
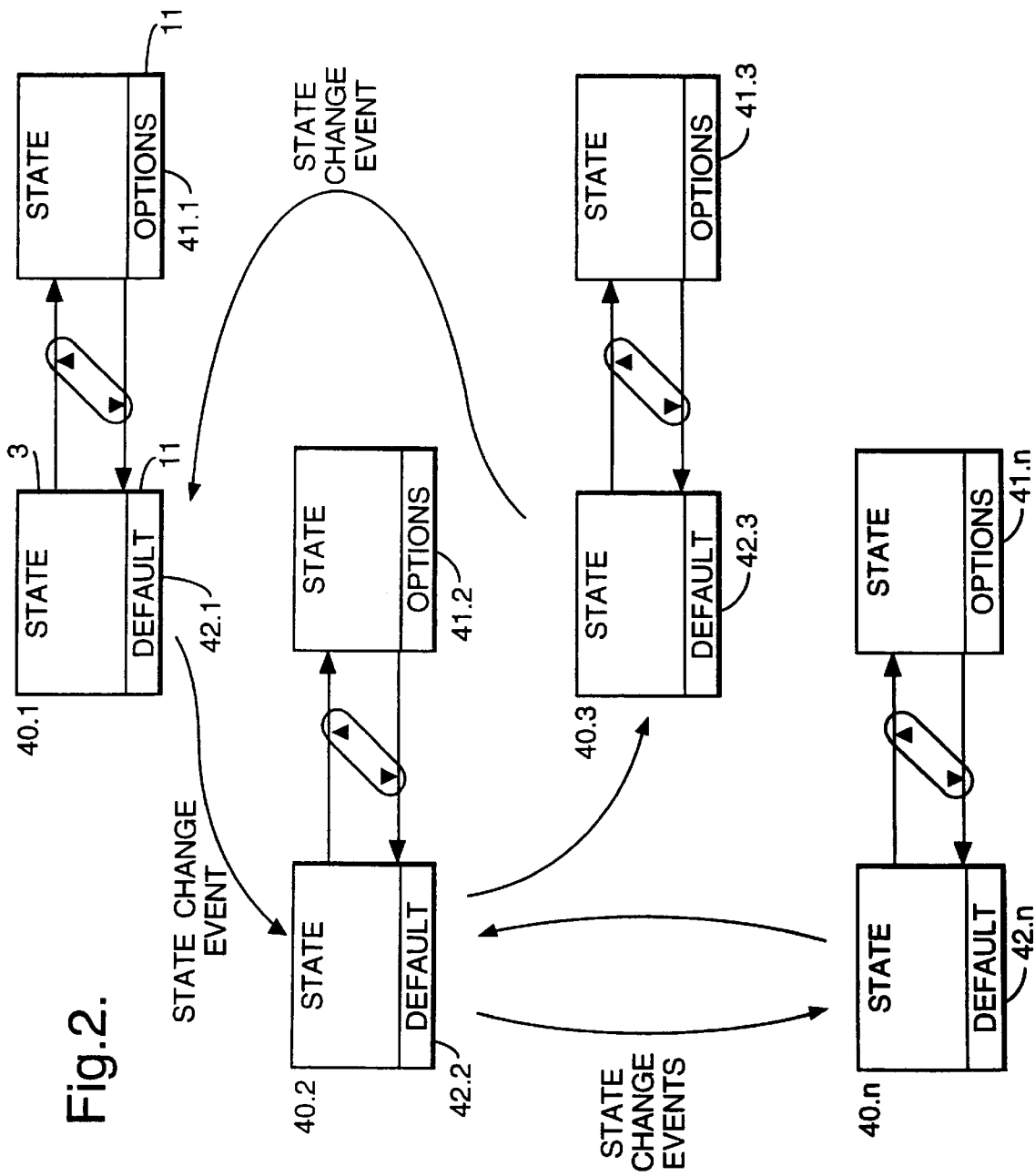
FIG. 2 shows switching between the states of the phone.

The invention is based on the idea that the phone can assume a plurality of predetermined states 40.1–40.n, which is illustrated in FIG. 2. A plurality of actions (options 41.1–41.n) may be performed in these states 40.1–40.n. The display image at arrival to state 40.1 may be a phone number or the name of a person contained in the phone book of the phone, which is indicated by "state". "State" might also cover "incoming calls", "E-mail received", "SMS received", etc. If the display contains a phone number, the default function 42.1–42.n might be "call". The scroll key 8 allows switching from the default function to the group of possible functions, to which the default function belongs. It is noted that, in the preferred embodiment, the scroll key 8 toggles between the default function and the group of possible functions (options), but switches between items in the group of possible functions, once this group has been selected by means of the single multi-functionality key. The state is maintained during toggling and scrolling through the options.

As will be seen from FIG. 2, a state change event will result in a change from one state to another. The new state depends on the old state and the nature of the state change event. During an established call ("call established" state), the default function of the single multi-functionality key 8 will be "end" according to the preferred embodiment. If a new incoming call "is waiting", the user may use the scroll key 9 to produce the option list including items such as "end", "join", "answer" and "swap" without interrupting the call.

Each state 40.1–40.n is associated with a predefined group of functions, actions or options 41.1–41.n, which are possible precisely for that state. Establishment of conference calls, e.g., can be performed only when a call has already been established. A preferred function serving as the default function 42.1–42.n is designated in each of these groups. This designation may be performed by the programmer during programming, by the user through his redefinition of the default function, or by the phone itself in that it records the frequency of the use of the individual functions and appoints the most frequently used one in each group as the default function—optionally with the user's acceptance.

When the phone changes its state, the single multi-functionality key can perform the default function if it is activated, and the user may toggle between the default function and the whole group of options by means of the scroll key. If the group of options is selected with the single multi-functionality key, the user will be able to scroll through the group of options with the scroll key and to select the desired (designated) function with the single multi-functionality key.

When a function is selected with the single multi-functionality key, the processor 17 runs the associated program sequence to execute the function.

Figure 4:
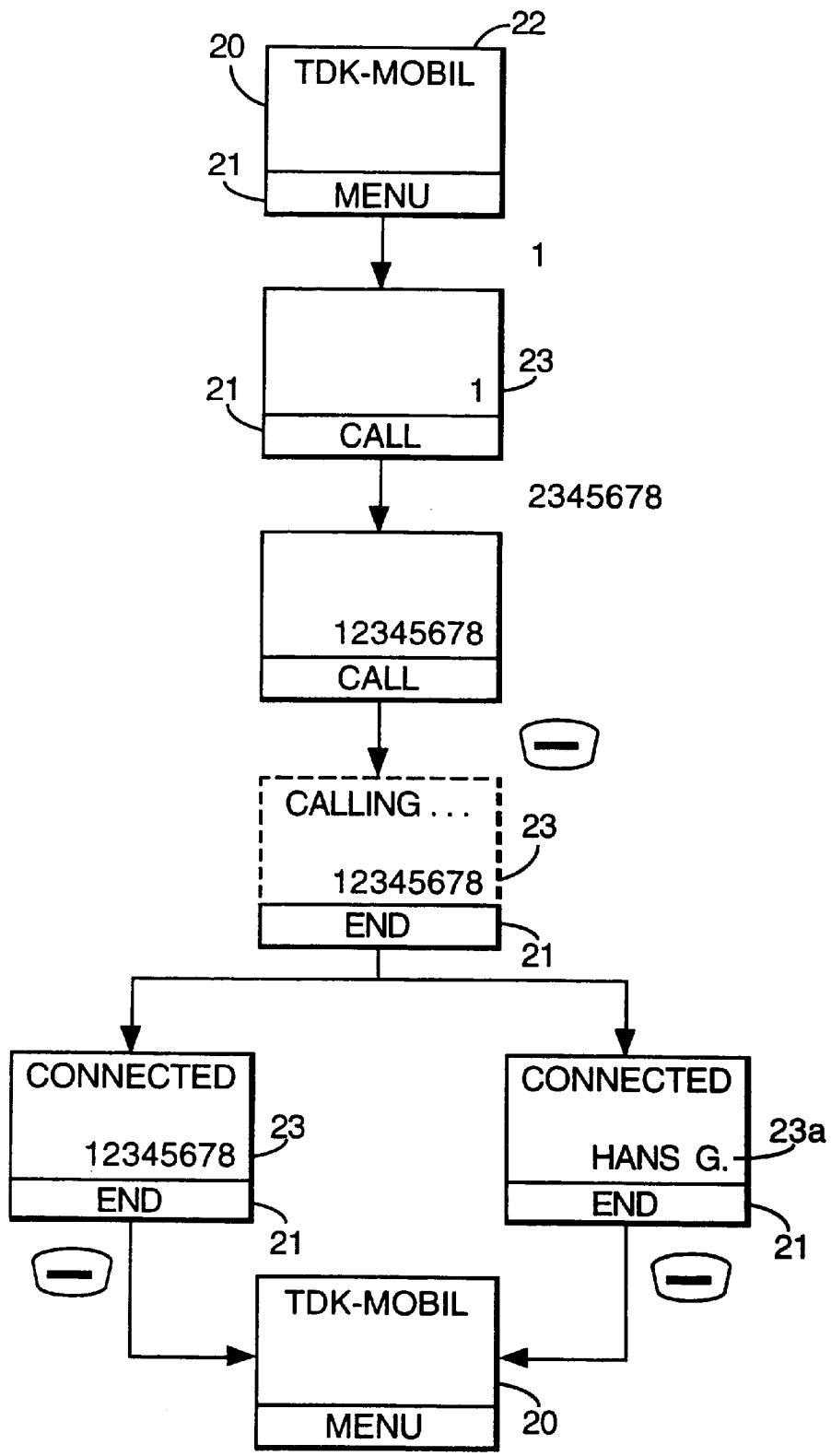
FIG. 4 shows a sequence of display images in connection with call establishment.

FIG. 4 shows the display text with simultaneous indication of the keys of the keypad which have been activated. The display 3 has a display image 20 ("idle mode" state)

which shows the function of the soft key 8 as a highlighted bar in a predetermined area (soft key display) 11, 21 of the display. The function of the soft key 8 in the idle mode is to provide access to the main menu loop of the phone. The upper part of the display 20 shows an identification of the network operator concerned (here TDK-MOBIL). The display may additionally contain an indicator of the antenna signal strength and a battery voltage indicator. These are not shown in the figures, as they have no importance to the description of the default function.

When the user enters the FIG. 1 by means of the alphanumeric keys 7, the processor 17 records this, and the phone then changes to a "number handling state". The default function is call establishment here, and "call" is therefore displayed in the soft key display 11. When the phone changes from the idle mode, the operator identification disappears, while the entered digit is displayed in the main area 12, 23 of the display image 20.

When several digits are entered, these are displayed as they are entered after the digit entered first. When the soft key 8 is activated, it is attempted to establish a call, which causes the phone to change to a "call established state" under the control of the processor 17, and the new function "end" of the single multi-functionality key 8 is now displayed in the soft key display 11, 21. It is shown at the same time in the display that it is attempted to establish a call, which is done by the indication "calling . . . ". The number to which the connection is to be established is still displayed in the main area 23 of the display.

When the call has been established, this is shown by the indication "connected" at the top of the display and by an indication of the phone by means of which the call has been established. As will be seen from the branch, this identification may be the phone number in the field 23 or a name code 23a, if the processor recognizes the number in its associated phone book. The default function of the soft key 8 will still be "end", which is shown in the soft key display 21. If the soft key 8 is activated once more, the call will be interrupted, and the phone will return to the "idle mode state" with the idle mode display image 20.

Figure 5:
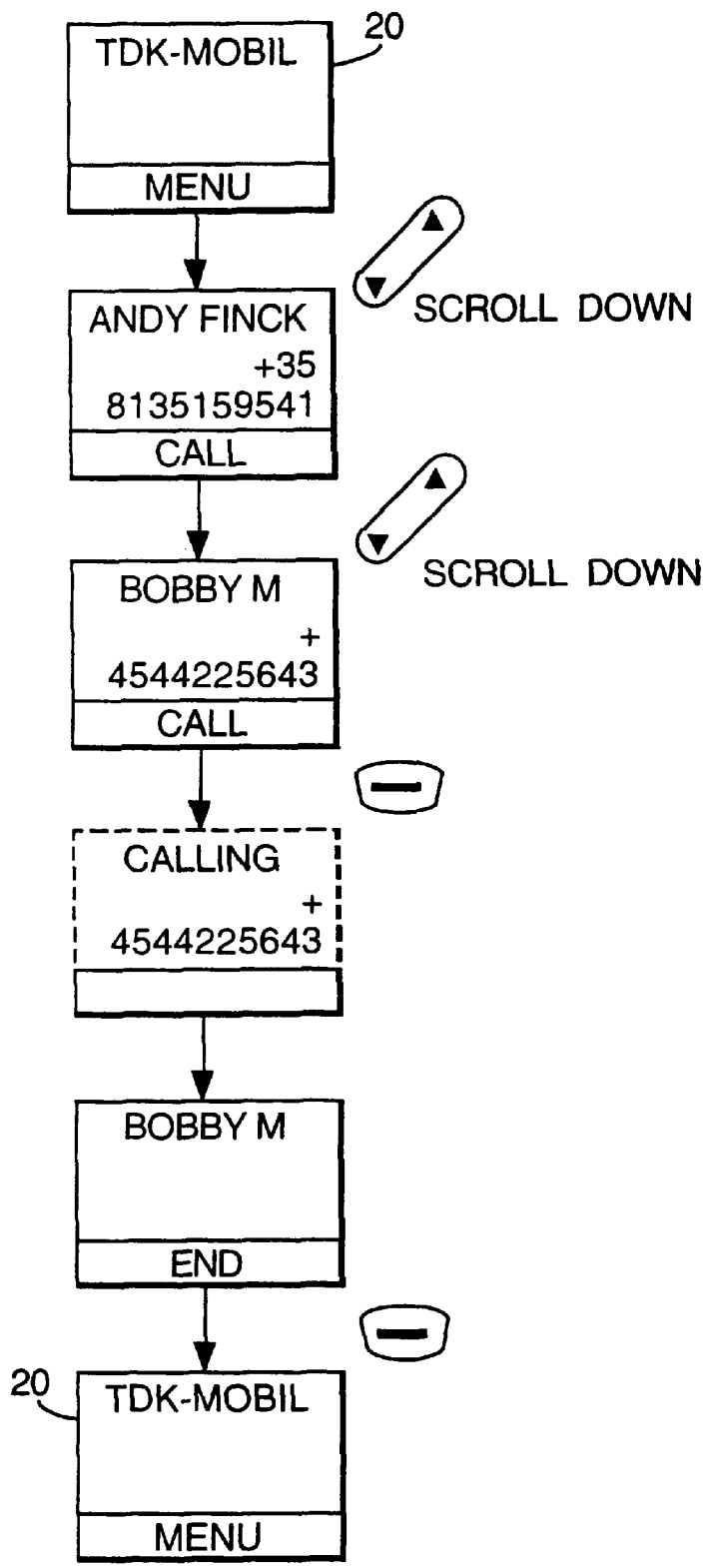
FIG. 5 shows another sequence of display images in connection with call establishment.

FIG. 5 shows a corresponding scenario; here, the user decides to use the scroll key 9 from the idle mode display image 20 to gain access to the phone book of the phone under the main menu loop, which causes the phone number and the name code of the first storage location in the phone-book to be displayed in the display. The phone changes to the "number handling state", and the new default function "call" of the single multi-functionality key 8 is now displayed in the soft key display 21. By continued use of the scroll key 9 the user will be able to scroll through the phone book until he finds the number he wants. Since the single multi-functionality key 8 maintains its "call" function as the default function, the call can still be established by depression of the single multi-functionality key 8. Then, the call can be established and terminated, as explained in connection with FIG. 4.

Figure 6:
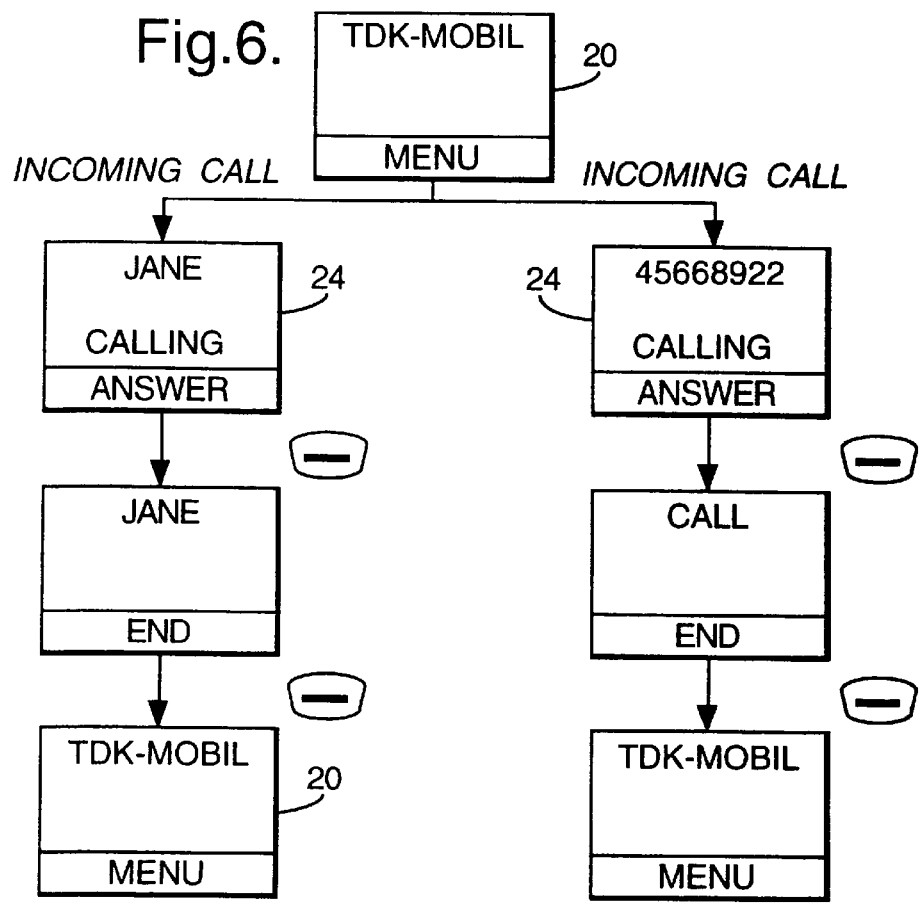
FIG. 6 shows a sequence of display images in connection with call answer.

FIG. 6 shows how an incoming call is displayed. When the phone records an incoming call, the processor 17 detects this as a non user event, and the phone changes from the "idle mode state" to an "incoming call state", so that the display image 20 is replaced by a new display image 24. The calling phone is identified by phone number (right branch) or name code (left branch), if it is recognized from the phone book of the phone. In some cases the calling phone cannot be identified, and the identification field will therefore be empty (not shown). The single multi-functionality key 8 will simultaneously assume a new default function under the control of the processor 17, and the new default function will answer the call ("answer") in the preferred embodiment. When the call has been established, the phone changes to the "call established state", and the display displays the name code of the calling phone or merely indicates that a call takes place if the name code is not recognized. In this state, the default function of the single multi-functionality key 8 is "end", and it continues to be displayed in the soft key display 21. If the single multi-functionality key 8 is activated, the call will be interrupted, and the phone will return to the "idle mode state" with the idle mode display image 20.

Figure 7:
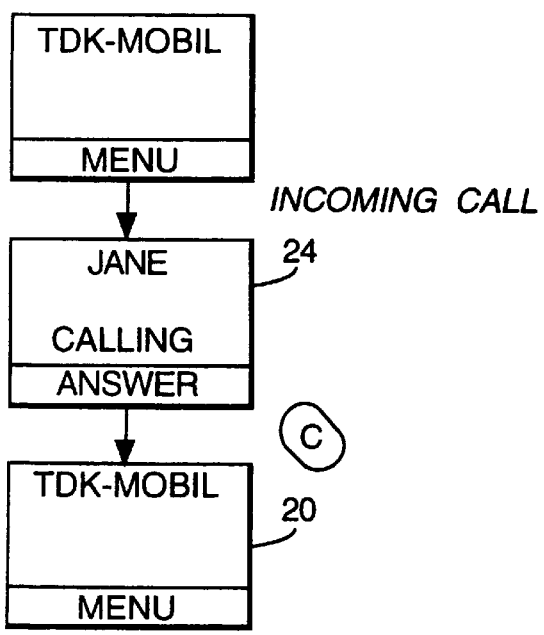
FIG. 7 shows a sequence of display images in connection with call rejection.

FIG. 7 correspondingly shows how the display image 20, 24 changes when an incoming call is detected and the phone changes to the "incoming call state" with the default function "answer". If the user does not want to answer the call, he can reject the call by depressing the c key or divert the call to his voice mail, if he has such a feature. The phone then returns to the "idle mode state" with the idle mode display image 20.

Figure 9:
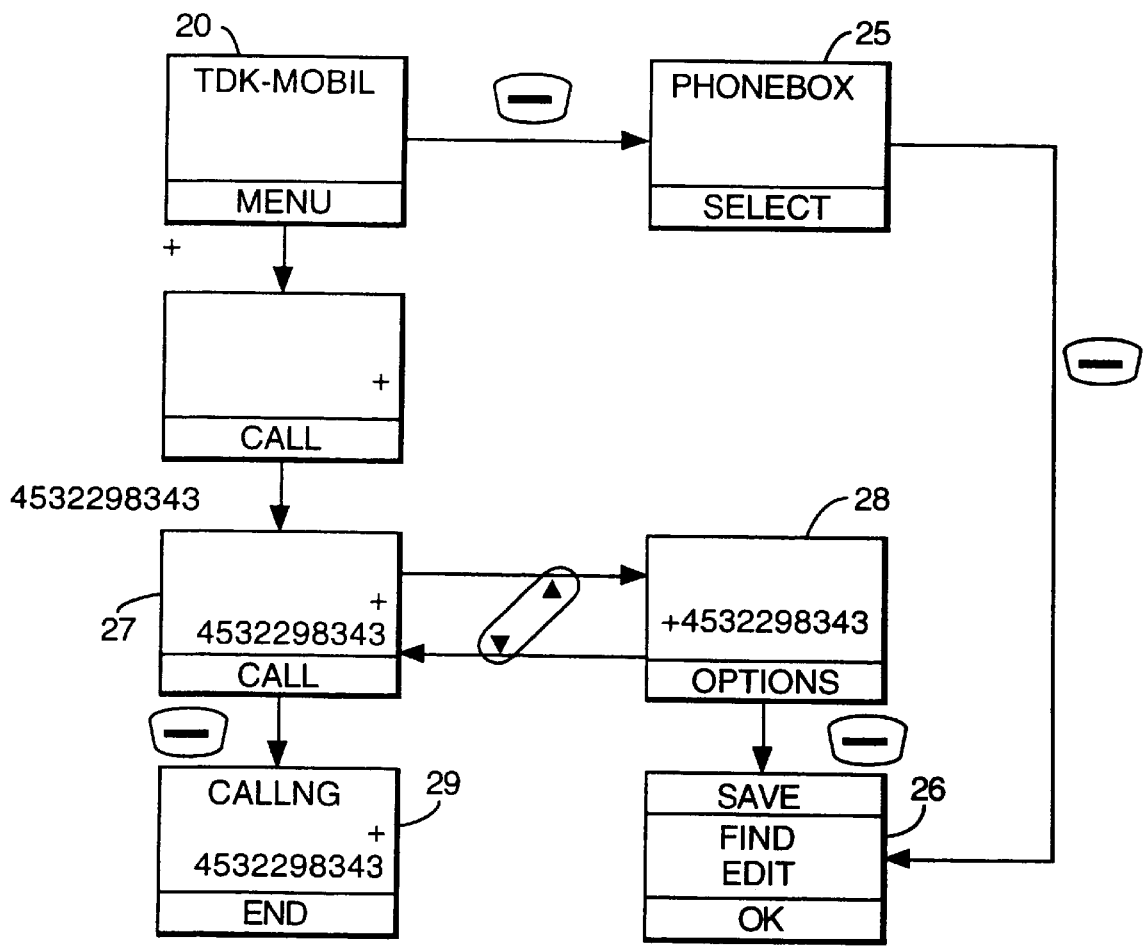
FIG. 9 shows a sequence of display images in connection with call establishment and access to the phone book.

FIG. 9 shows how it is possible to change from the "idle mode state" with the display image 20 (idle mode display) to a main menu by activating the single multi-functionality key 8. Here, access to the phone book is presented as default. If the user selects this, he may choose between the individual sub-menu items in the phone book via the display image 26. If, in the "idle mode state", the user had instead begun to enter a phone number, the phone would have changed to a "number handling state" with a display image 27 with "call" as the default function. The user may switch to possible functions in this state (display image 28) by means of the scroll key 9, and these functions comprise the sub-menu items (display image 26) of the phone book. If, instead, the user had selected the default function in the "number handling state", the phone would have started establishment of a call (display image 29).

Figure 8:
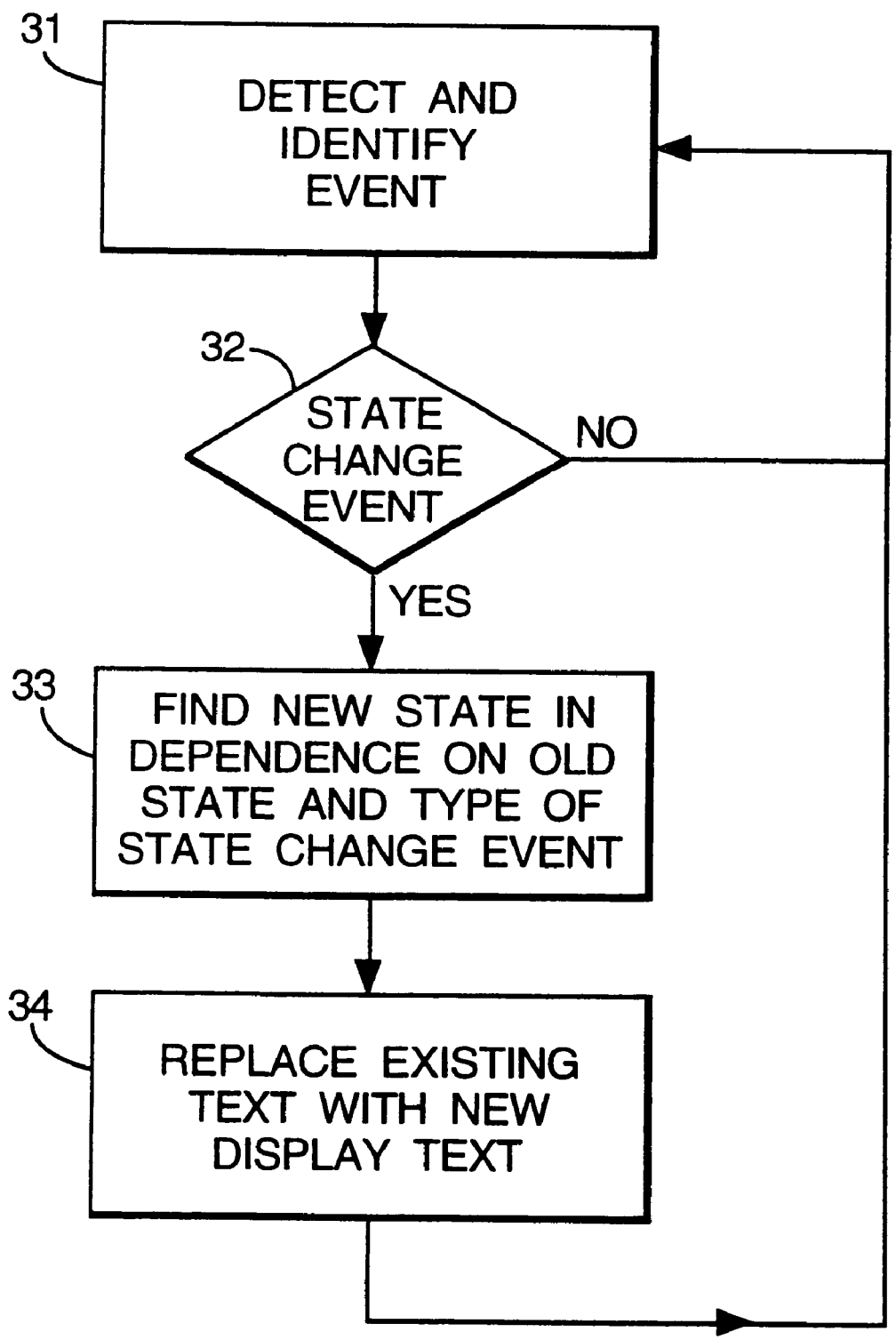
FIG. 8 shows a flow diagram illustrating the decision processes in the controller unit in the phone according to the invention.

When the phone is in idle mode, it communicates with a fixed station at regular intervals via paging messages to maintain the connection, and it monitors its peripheral units in the form of battery, keypad, etc. It is the microprocessor 17 which controls these activities, and when it detects an event, it checks whether the phone is to change its state, e.g. from the "idle mode state" to the "incoming call state". FIG. 8 illustrates this process, where the processor in stage 31 monitors and detects occurring events. If a detected event is not a state change event, the processor returns to the search stage and searches for a new event. If the processor identifies the event as a state change event in the decision stage 32, the processor identifies the new state in stage 33, which takes place by means of a state tree, and replaces the old display text by a new default function indication of the new text, which takes place in stage 34.

Although it is shown in the preferred embodiment that the functions of the phone might very well be controlled by a single multi-functionality key, it may be found expedient in some cases to use two or more multi-functionality keys in the second group of keys, optionally integrated in a touch-sensitive display.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A phone adapted to allow via a controller the functionality of three keys to be integrated in a single key comprising:
   a user-interface including a single multi-functionality key with multiple functionalities, the multi-functionality key providing access to a menu structure of the phone as well as handling of calls including initiation, answering and termination of calls whereby the handling of calls is provided by the same key as gives access to the menu structure of the phone;
   a display having an area dedicated for displaying the present functionality of the multi-functionality key;
   a scroll key to scroll between multiple functionalities of the multi-functionality;
   a controller which controls the functionality of the multi-functionality key, a state of the phone, and information displayed in said dedicated are of the display;
   the phone being capable of assuming a plurality of states controlled by the controller, whereby a group of predetermined actions associated with the state concerned are adapted to be performed by means of the multi-functionality key; and
   the controller selecting and displaying an action from the group of actions as the present functionality for the multi-functionality key in dependence of the state of the phone.

2. A phone according to claim 1 wherein said multi-functionality key furthermore provides access to handling of a user controlled phone number database.

3. A phone according to claim 2 wherein said controller furthermore monitors activity of a network to which the phone is connected, and said activity is used to define the states according to which the present functionality for said single multi-functionality key is selected.

4. A phone according to claim 1, wherein the user interface consists of a set of alphanumeric keys, said multi-functionality key, a scroll key by means of which alternative functionality for said multi-functionality key is accessible, and a "clear" key.

5. A phone according to claim 4, wherein the alphanumeric keys are controlled by the controller to automatically change mode in dependence on the state of the phone.

6. A phone according to claim 4, wherein handling of records in a phone number database are available via said multi-functionality key, said handling including entering new records and amending or deleting existing records.

7. A phone according to claim 6, wherein a default functionality for said multi-functionality key, when a record of the phone number database is displayed, is "call establishment".

8. A phone according to claim 1, wherein a default functionality for said multi-functionality key, when a phone number has been entered and is displayed in the display, is "call establishment".

9. A phone according to claim 1, wherein a default functionality for said multi-functionality key, when a call has been established, is "call termination."

10. A phone according to claim 1 wherein a default functionality for said multi-functionality key is call handling, that is call establishment, answering an incoming call and call termination.

11. A telephone as in claim 1 wherein, in an idle mode state of the telephone, the displayed action corresponds to a function of opening a main menu of features of the telephone.

12. A telephone as in claim 11 wherein, in a number handling state of the telephone, the displayed action corresponds to a function of calling a telephone number corresponding to indicia displayed on the display.

13. A telephone as in claim 11 wherein, in a call established state of the telephone, the displayed action corresponds to an end call action to place the telephone on-hook.

14. A telephone as in claim 11 wherein, in an incoming call state of the telephone, the displayed action corresponds to a function of answering an incoming call.

15. A phone comprising:
   a user interface including a single multi-functionality key, with multiple functionalities, the multi-functionality key supporting handling of calls;
   a display having an area dedicated for displaying the present functionality of the multi-functionality key;
   a scroll key adapted to scroll between multiple functionalities of the multi-functionality key; and
   a controller unit which controls the functionality of the multi-functionality key, the state of the phone, and the information displayed in the dedicated area of the display; the controller unit when detecting when a call is establishable based on the number/characters in the display selects "a call establishment operation" for the single multi-functionality key and displays this action as the present functionality for the single multi-functionality key; and the controller unit when detecting that a call is established from the present state selects "a call termination operation" for the single multi-functionality key and displays this action as the present functionality for the single multi-functionality key.

* * * * *